April 5, 1927.  R. C. COLEMAN  1,623,307
TIRE RIM
Filed May 5, 1924
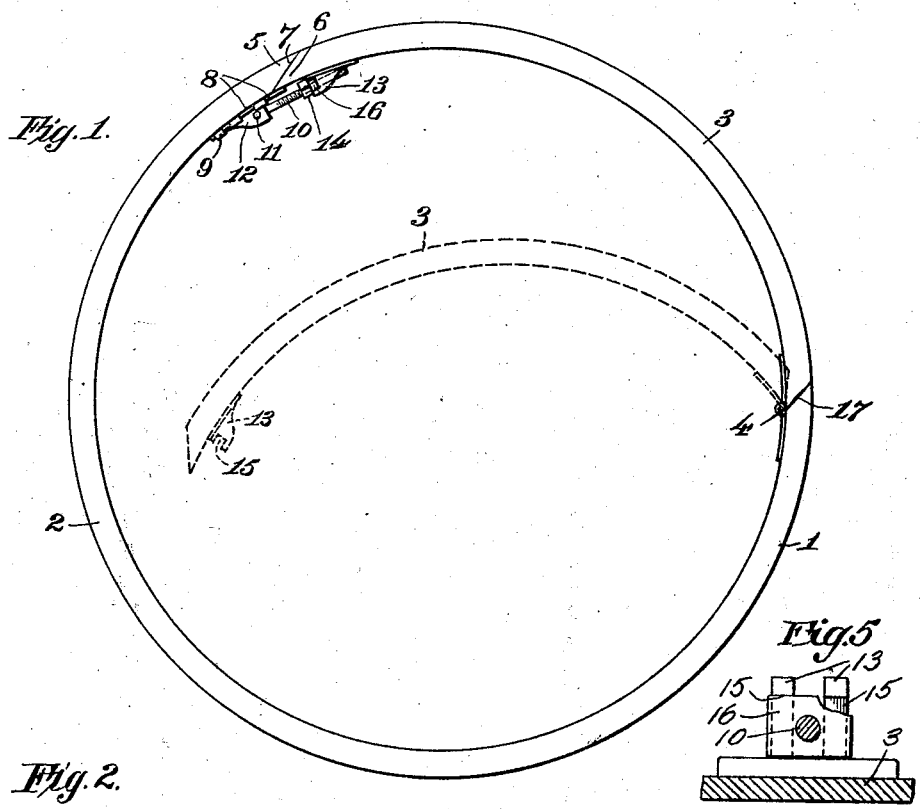
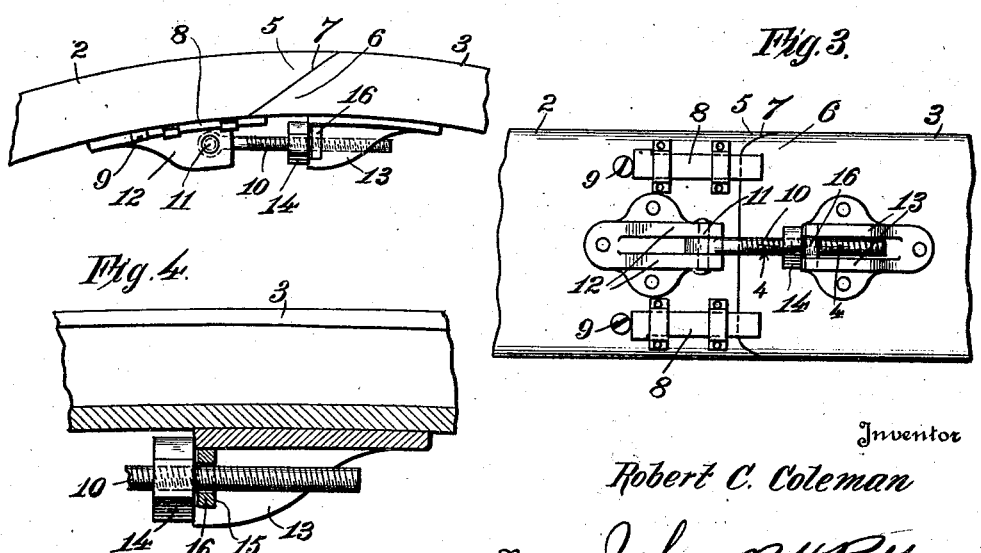
Inventor
Robert C. Coleman
By Joshua R.H. Potts
Attorney Patented Apr. 5, 1927.

1,623,307

UNITED STATES PATENT OFFICE.

ROBERT C. COLEMAN, OF WIND GAP, PENNSYLVANIA.

TIRE RIM.

Application filed May 5, 1924. Serial No. 710,992.

My invention relates to demountable rims for vehicle tires, and the object of my invention is to provide an improved rim of the class mentioned which will admit of rapid change of the tire. A further object of my invention is to provide an improved rim of the class mentioned adapted for use in conjunction with the ordinary wheels and tires. A further object of my invention is to provide a device of the class mentioned, equipped with means for securing and maintaining the parts in operative position. Further objects of my invention are to provide a device of the character mentioned which shall not add materially to the cost of production over the ordinary demountable rim, and which will not readily get out of order. Other objects will appear hereinafter.

With these objects in view my invention consists generally in a tire rim comprising a pair of hingedly connected sections, the non-hinged abutting ends being provided with means for expanding the rim, and the abutting ends being beveled and provided with improved means co-operating with the adjacent ends to hold the parts in extended position. My invention further consists in various details of construction and arrangements of parts all as will be fully described hereinafter and particularly pointed out in the claim.

My invention will be more readily understood by reference to the accompanying drawings forming a part of this specification and in which—

Fig. 1 is a side elevation of a demountable rim embodying my invention;

Fig. 2 is a detail elevation upon an enlarged scale, illustrating the abutting ends of the sections and the parts associated therewith;

Fig. 3 is a plan view of the same;

Fig. 4 is a detail section on the line 4—4 of Fig. 3 upon a much enlarged scale, and Fig. 5 is an enlarged transverse section through the device.

Referring now to the drawings 1 indicates the rim, which may be of any ordinary or preferred cross section. In carrying out my invention, I form the rim of two sections 2 and 3, respectively, the latter being preferably smaller than the former, usually consisting of about one-third of the circumference, although I do not limit my invention to such proportions. The sections 2 and 3 are hingedly connected at 4; any preferred hinged construction being employed.

The normally abutting free ends 5 and 6 are equipped with means for holding the ends in operative position and with means for expanding the rim after the tire has been placed thereon. It will be noted that the adjacent ends are correspondingly beveled as at 7, and that the bevel is such as to permit the section 3 to swing inwardly. The end 5, on its inner face is provided with one or more sliding bolts 8—8, which, when in the position shown in the drawings, will engage under the end 6 and prevent the section 3 from swinging on the hinge 4. Any means may be employed for holding the bolts in projected position, such as tap-screws 9.

10 indicates an expansion bolt, pivotally mounted as at 11 between a pair of lugs 12 on the end 5. The end 6 is provided with a corresponding pair of lugs 13 to receive the bolt between them; and a nut 14, threaded on the bolt 10, impinges against the ends of the lugs 13 and provides means whereby the rim may be expanded after the sections are in normal or operative position. To prevent the bolt 10 from slipping from between the lugs 13, the forward edges of said lugs are recessed as at 15 to receive a small block 16 which is loosely mounted on the bolt 10 as shown clearly in Fig. 4.

It will be noted that the hinged ends are correspondingly beveled but oppositely from the bevel 7 which prevents the hinged end from impinging on the tire when swinging inwardly and prevents pinching the tire when the hinged section is moved to normal position. It is obvious that when with a rim of the construction above described that a tire may be readily and quickly removed and quickly replaced, the only tool necessary being a wrench for the nut 14 and a screw driver for the tap-screws 9, if such are used for the locking means for the bolts 8. The lugs 12 and 13 are adapted to fit in small recesses in the felly of the wheel, which recesses will not be of sufficient size to weaken the felly, but which arrangement provides means to prevent the rim from creeping on the wheel and tearing out or damaging the inner tube valve.

I claim:

A demountable rim having the adjacent ends correspondingly beveled, an expansion bolt pivoted to said rim adjacent one end thereof, a pair of lugs on the other end of the rim adapted to receive said bolt between them, a nut on said bolt impinging against said lugs, said lugs being provided with transverse notches, and a bar on said bolt resting in said notches and held therein by said nut, substantially as described.

In testimony whereof I have signed my name to this specification.

ROBERT C. COLEMAN.